United States Patent

[11] 3,612,223

| [72] | Inventors | Masanao Shiomi<br>Toyota-shi;<br>Tadataka Narumi, Kariya-shi, both of<br>Japan |
|---|---|---|
| [21] | Appl. No. | 882,582 |
| [22] | Filed | Dec. 5, 1969 |
| [45] | Patented | Oct. 12, 1971 |
| [73] | Assignee | Toyota Jidosha Kogyo Kabushiki Kaisha<br>Aochi-ken, Japan |
| [32] | Priority | Dec. 17, 1968 |
| [33] |  | Japan |
| [31] |  | 43/92762 |

[54] ENERGY-ABSORBING DEVICE
7 Claims, 7 Drawing Figs.

[52] U.S. Cl. ................................................ 188/1 C,
74/492, 293/70
[51] Int. Cl. .................................................... F16f 7/12
[50] Field of Search ............................................ 74/492,
493; 188/1 C; 293/70; 297/386

[56] References Cited
UNITED STATES PATENTS

| 2,165,274 | 7/1939 | Kessenich ..................... | 188/1 C UX |
| 3,373,629 | 3/1968 | Wight et al. .................. | 74/492 |
| 3,482,872 | 12/1969 | Chamberlain ................ | 188/1 C X |

*Primary Examiner*—Duane A. Reger
*Attorney*—Berman, Davidson and Berman

ABSTRACT: An energy-absorbing device having an elongated platelike member formed of a material having a high resistance to plastic deformation and provided with a plurality of spaced narrow slits whose edges lie in close or abutting relation, the slits lying in spaced lines perpendicular to the longitudinal direction of the plate, certain of said slits being closed at both ends and said slits being opened only upon application of an external force tending to elongate the plate, said member being fixed at one end through a force receiving member to a vehicle accessory, such as a bumper, and being fixed at the other end through a support member to the vehicle chassis.

PATENTED OCT 12 1971 3,612,223

INVENTORS.
MASANAO SHIOMI,
TADATAKA NARUMI,

BY
Berman, Davidson & Berman ATTORNEYS.

3,612,223

INVENTORS.
MASANAO SHIOMI,
TADATAKA NARUMI,

BY
Berman, Davidson & Berman,
ATTORNEYS.

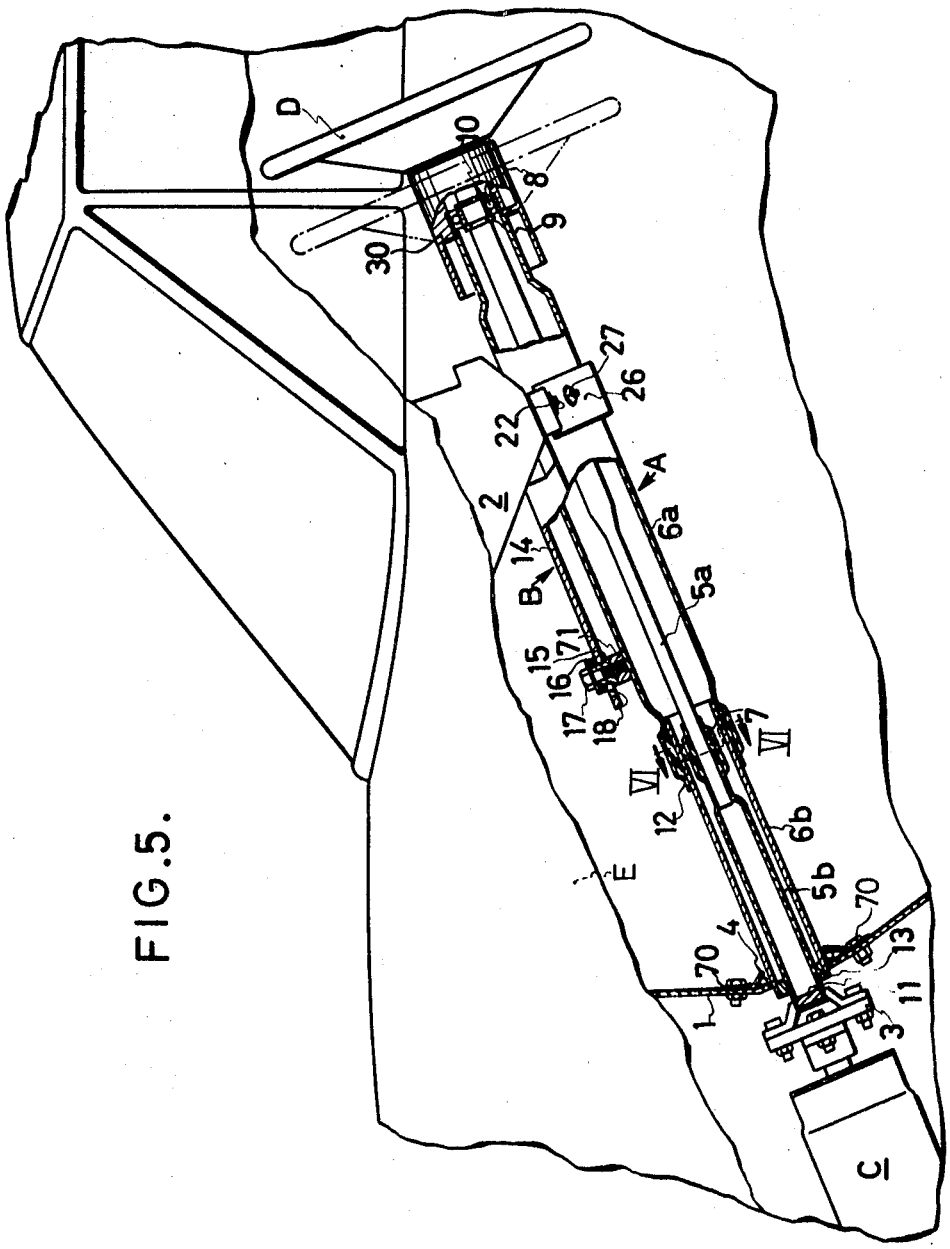

ENERGY-ABSORBING DEVICE

BACKGROUND OF THE INVENTION

The present invention relates to an energy-absorbing device which may be used with the steering wheel, seat fixing, or bumper-connecting means, or the like, of a vehicle for safety of the vehicle operator and protection from any unusual force imparted from outside the vehicle on collision thereof. The recent increase in speed and power of automobiles has made it socially important to safeguard the car and its occupants during inadvertent collisions which often cause serious injuries to the driver, or other occupants of the vehicle. In conventional vehicles unequipped with retractable steering wheels, the driver lurches forward due to inertia at the instant of collision and strikes his breast sharply against the steering wheel.

The present invention is intended to overcome this problem by providing an energy-absorbing device in the car which, for example, may form a part of the steering rod assembly permitting the retraction thereof upon collision and thereby avoiding injury to the driver as would occur in vehicles equipped with conventional nonretractable steering rod assemblies. Alternatively, the energy-absorbing device may be assembled with other parts of the vehicle, such as the seat fixing means, or the bumper connection means, so as to absorb the external collision force effectively and avoid injury to the driver, or other occupants of the vehicle. Destruction of the vehicle parts is also avoided.

SUMMARY

The device according to the invention comprises a receiving member for receiving external forces, a supporting member for supporting the receiving member movably, or slidably, and an energy-absorbing member having its ends respectively fixed to said receiving and supporting members. The energy-absorbing member is formed of resilient material having high resistance against plastic deformation and is of platelike shape provided with a plurality of spaced and staggered slits disposed transversely to the external force. The slits have closely spaced, or abutting side-by-side edges, whereby the absorbing member will not yield and plastically deform in one direction, but will yield and deform in the opposite direction spreading apart the said side-by-side slit edges. Certain of said slits disposed entirely within and spaced from the edges of the member are closed at both ends.

A principal object of the invention is to provide an energy-absorbing member which is plastically deformable by spreading apart closely spaced walls of slits formed therein, and a force receiving member movable with respect to a supporting member for holding the energy absorbing member and deforming the latter when an external force is applied to the receiving member, thereby avoiding damage that would otherwise occur to other parts of the assembly, the vehicle, or the occupants of the vehicle in which the device is mounted.

Another object of the invention is to provide an energy-absorbing device having an energy-absorbing plate having a plurality of spaced and staggered slits each having nearly abutting edges so that the slits will open only upon application of an external force tending to elongate the plate, but will not open upon application of a compressive external force.

Yet another object of the invention is to provide an energy-absorbing device having relatively simple components, easy to produce and economical to manufacture, and which, after absorption of energy from an external force, can be replaced simply by again plastically deforming the deformed portion of the device to assume its original shape for repeated operations.

BRIEF EXPLANATION OF THE DRAWINGS

The novel features which are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

FIGS. 5 to 7 are examples of the application of the embodiment of FIG. 1 to the steering wheel of a vehicle, in which FIG. 5 is a side elevation with parts broken away and in section; FIG. 6 is a cross-sectional view taken along line VI—VI in FIG. 5; and FIG. 7 is a cross-sectional view taken along line VII—VII of FIG. 1.

PREFERRED EMBODIMENTS

Figure 1:
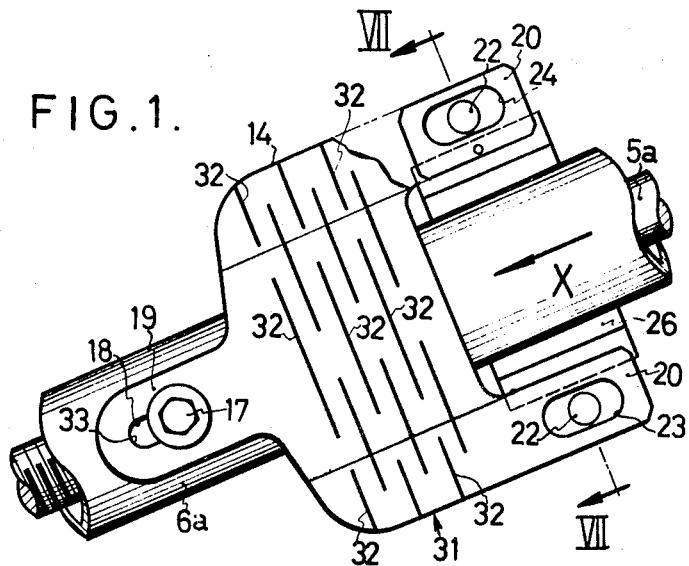
FIG. 1 is a plan view of the energy-absorbing device according to the invention for incorporation in a steering rod assembly such as that of FIG. 5.
Figure 2:
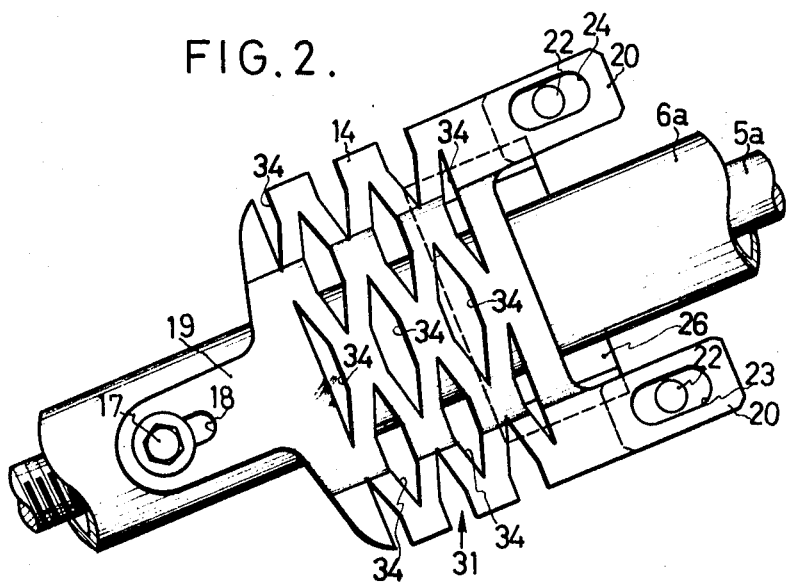
FIG. 2 is a plan view showing the energy-absorbing device of FIG. 1 after it has been stretched to absorb shock, or collision energy.

Referring now more particularly to the drawings, FIGS. 1 and 2 show a shock-absorbing device according to the invention and which is of general application. FIG. 5 shows the same device as part of the steering rod assembly of an automobile. The steering device A comprises a telescopic steering shaft formed in upper and lower portions $5a$ and $5b$ coaxial with and surrounded by a telescopic, tubular steering post, or column, in which the shaft rotates. Combined with these is a novel energy-absorbing member and supporting parts generally indicated by the reference character B. The steering wheel device is shown installed in an automobile having conventional parts such as a gearbox C, steering wheel D, body or chassis E, a firewall separating the engine and driver compartments and having a lower portion, or toe plate 1, and an instrument panel 2. The gearbox C is rigidly fixed to the chassis in a conventional manner, not shown. The upper portion $5a$ of the steering shaft is connected to the steering wheel D, while the lower portion $5b$ is connected to the gearbox C through a conventional flexible joint 3 so as to transmit the torque of the steering wheel to the gearbox. The lower steering shaft portion $5b$ passes through a low friction ring 4 positioned about an opening in the toe plate 1, and the upper portion $5a$ is connected to the instrument panel 2 through the energy-absorbing device B, as will be more fully explained later. The tubular steering post 6 has two telescopic portions, $6a$ and $6b$, surrounding the corresponding telescopic portions $5a$ and $5b$ of the shaft.

Figure 6:
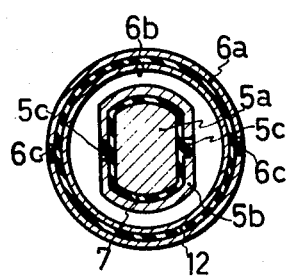

The steering shaft upper portion $5a$ is formed as a bar, while the lower portion $5b$ is a cylindrical tube, both being arranged to have a common axis. The lower end of portion $5a$ is telescopically fitted into the upper end of portion $5b$, so as to be capable of extending and retracting in the axial direction, but relative rotary motion is restricted so as to transmit the steering torque. Particulars of this construction are presented in FIG. 6 in which the member $5a$ has a circular cross section flattened at opposite diametrical areas to present parallel, planar sides. The cylindrical member $5b$ is correspondingly flattened to receive the member $5a$ with a close fit. Thus, the members $5a$ and $5b$ can telescope, or slide axially with respect to each other, but both must revolve together without relative rotary motion. During manufacture, synthetic resin 7 is injected under compression between the fitting surfaces of the members $5a$ and $5b$ through a small hole $5c$ provided on the lower member $5b$, while said members $5a$ and $5b$ are fitted together so as to remove play during rotation.

The upper end of steering shaft 5 is connected to the steering wheel D and rotates in ball bearings 8 held from axial movement by snap rings 9 and 10. The outer race of ball bearings 8 is fastened to the upper steering column member $6a$. A dust keeper 11 is provided at the lower end of the steering shaft member 5b to prevent the entrance of dust, mud, water, etc.

The steering column upper member 6a is of larger diameter than the lower member 6b, being coupled at 12 for telescopic movement, and the two members are arranged coaxial with the steering shaft 5. The coupling 12 involves closely interfitting the lower end of 6a to the upper end of 6b in such manner that they may move relative to one another to extend or retract the column 6 in the axial direction. A synthetic resin is injected into the coupling under compression between the fitting surfaces of 6a and 6b through a small hole 6c in the upper member 6a during manufacture. The interfit at the coupling is sufficiently tight as to normally prevent relative axial movement of the members 6a and 6b, as well as bending in the absence of an unusual force such as engendered in a collision. The molded synthetic resins 7 and 12 will in no way obstruct the relative extension and retraction movements of the members 5a, 5b, and 6a, 6b when subjected to collision forces, both resins yielding to permit relative sliding movements with slight friction between the respective portions of the steering shaft and steering column.

The lower steering column member 6b is loosely fitted through the hole in toe plate 1 surrounded by the friction ring 4. This ring is closely fitted to the outer periphery of member 6b and connected to the toe plate by an annular attaching member 70 secured by bolts. The ring 4 supports the lower member 6b to be immovable radially without preventing movement in the axial direction. A dust keeper 13 is provided between the steering shaft 5b and steering column member 6b to prevent entrance of dust, mud, water, etc., into the steering column 6.

Figure 7:
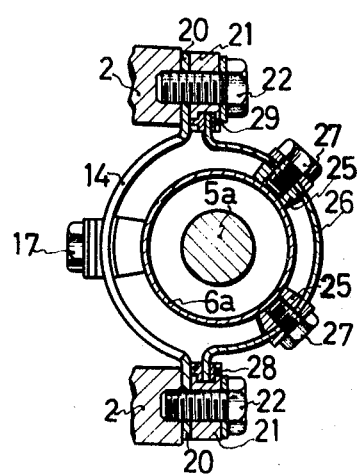

The steering column upper portion 6a is attached to the instrument panel 2 through the energy-absorbing device B as illustrated in detail in FIGS. 1, 2 and 7. The energy absorbing member, per se, is a semicircular plate designated 14, having a lower projecting tongue 19 which is rigidly fastened to the member 6a by bolt 17 and small friction bushings 15 and 16, FIG. 5. The bolt 17 passes through an elongated slot 18 disposed axially of the tongue. Normally, the bolt 17 is tightened adjacent to the upper end of the slot 18, as shown in FIG. 1.

A pair of projecting tongues 20 are formed at the upper end of plate 14. Each tongue is longitudinally slotted at 23, 24 to receive a bolt 22, which, as shown in FIG. 7, passes through the slots and holds plate 14 and spacer guide 21 to the instrument panel 2. Normally, the bolts 22 are fastened approximately in the middle of slots 23 and 24. On the upper steering column member 6a are welded internally threaded, cuplike spacers 25 to which are secured a semicircular bracket 26 by threaded bolts 27. The bolts pass through apertures in the bracket and firmly secure the latter to member 6a. Each guide 21 is somewhat elongated to overlie a substantial portion of the adjacent tongue 20. A longitudinal groove 28 is provided in the inner side surface of the guide and an end tab of said bracket 26 is slidably fitted in the groove through the small friction member 29. The guide members 21 are fixed to the instrument panel 2 by means of the bolts 22 which pass through openings therein. Since the fastening bolts 22 are spaced from the bracket grooves 28, the bracket can move in the grooves longitudinally of the guide members 21 relative to the instrument panel either upwardly or downwardly parallel to the axis of the steering column 6.

The lower tongue 19 of the energy-absorbing plate 14, as shown in FIG. 5, has a small friction bushing 15 disposed between itself and the spacer collar 71 projecting from the outer periphery of the steering column portion 6a, and another small friction bushing 16 between the washer on the bolt 17 and the tongue 19. The bolt is threaded to spacer 71 whose lower end is welded, or otherwise firmly secured to the steering column 6a.

The upper end of the steering column portion 6a has an inverted cuplike cover 30 integrally coupled therewith, which cover carries and supports the outer race of the ball bearings 8 rigidly fixed by their inner race to the steering shaft upper portion 5a. Consequently, the steering column 6 rotatably supports the steering shaft 5.

The energy-absorbing element, or plate 14, secured by tongues 19, 20, as above described, is formed as a semicircular plate of metal, metal alloy, or other suitable rigid, but slightly resilient material such as sheet steel. The middle portion 31 of plate 14 is made plastically deformable to absorb energy by provision of a plurality of narrow slits 32 preferably disposed in parallel lines, with the slits of adjacent lines staggered. Certain of the slits disposed entirely within and spaced from the edges of plate 14 are closed at both ends and the remaining slits are open to the side edges of plate 14. The lines of slits are perpendicular to the axial direction of the steering assembly as shown in FIG. 1, whereby a number of strips, partly interrelated with each other, are delineated by the slits. The edges, or walls of the slits 32 are in close abutting, or nearly abutting contact with each other, so that the plate portion 31 is rigid against compressive force exerted axially on the upper and lower tongues 20 and 19, and such forces will not vary the length of the plate 14. However, tensile axial forces, exceeding a predetermined value, when exerted on the tongues 19, 20 result in plastic deformation, causing plate 14 to take a grid form, as shown in FIG. 2, the slits opening wide to form spaces 34, and the length of plate 14 is increased. By such plastic deformation into grid form, the load energy is absorbed in the amount desired, or required.

The steering device, as described above, operates as follows. Upon accidental collision, when the vehicle operator's chest strikes the steering wheel D, the upper steering shaft member 5a moves downwardly and retracts into the lower member 5b. With movement of the steering shaft 5, the steering column upper member 6a also retracts into the lower member 6b. During such retraction movements of the members 5a and 6a, the energy-absorbing plate 14 fastened between the upper member 6a and the instrument panel 2 will have its midportion 31 elongated by the resultant tensile force. The plastic deformation of portion 31 of the energy-absorbing member 14 absorbs the kinetic energy of the steering shaft 5 produced by the collision.

The described action of absorbing energy will be amplified as follows. When the operator is thrown toward the steering wheel D and the striking force thus produced exceeds a predetermined value, there will occur a sliding in the telescopic fitting portions of the connected parts opposed by little friction. That is, in the wheel shaft 5, the synthetic resin 7 permits retraction of the upper member 5a opposed only by moderately small frictional forces between the interfitting portions of the upper and lower members 5a and 5b, and also in the steering column 6 the synthetic resin 12 permits retraction of the upper member 6a opposed only by moderate friction forces between the interfitting portions of the upper and lower members 6a and 6b. The bracket 26 integrated with the steering column upper member 6a slides downwardly along the groove 28 of the guide member 21, attached to the instrument panel 2 by bolt 22, and is opposed by a small amount of friction through the low friction member 29. Thus, the interfitting portions of the steering shaft and column pass from a static frictional condition to a dynamic, small frictional movement, whereupon the bolt 17 holding the member 6a will move to contact the lower end 33 of the slot 18 and carry the tongue 19 downwardly, stretching the energy-absorbing midportion 31 of the plate 14 so as to open the slits 32 and thereby absorb the desired energy. Thus, the plate 14 is plastically deformed gradually into grid form with widened spaces 34 defining said slits. This plastic deformation absorbs the shock of the operator striking the wheel. Therefore, as the chest of the operator strongly strikes the steering wheel, the absorption action of plate 14 soaks up the energy of collision in such a way that the operator is protected against damage, to a large extent.

An upward movement of the steering assembly A is caused by a frontal collision when the front portion of the chassis is deformed and the gearbox C is moved rearwardly. The rearward movement of said gearbox is transmitted upwardly to the lower steering shaft portion 5b through the flexible joint 3. Under this condition the upper steering shaft portion 5a transfers much of the force of collision upwardly in the axial direction to the energy absorbing plate 14 through the ball bearings 8, cover 30, and upper steering column portion 6a. Since the energy absorbing plate 14 is not plastically deformable under compressive loads, the midportion 31 of said absorbing member 14 will remain rigid, while the upper steering column portion 6a remains relatively fixed, being prevented from upward movement by the fastening to the instrument panel 2. Thus, the respective lower members 5b and 6b will retract upwardly into the upper members 5a and 6a without raising the wheel D to strike the operator, so that his safety is guarded, as it is in the reverse situation wherein the operator is thrown downwardly against the steering wheel D.

As may be understood from the preceding description, a novel feature of the invention resides in that the energy-absorbing element is not an integral part of the steering shaft assembly A, nor even a surrounding coaxial part, as has been employed conventionally, but instead is a separate unit individually disposed between the steering shaft and a chassis, or body portion of the vehicle. This makes it possible to reuse the energy-absorbing unit, or to replace the absorbing unit if the steering shaft assembly A remains connected and unharmed after a collision. By provision of a separate and individual energy-absorbing member it is also possible to apply such member to all varieties of cars, even though having different steering shaft assemblies, so long as they require the same amount of energy absorption, whereby larger quantities of absorbing members can be produced, and their cost lowered.

Figure 3:
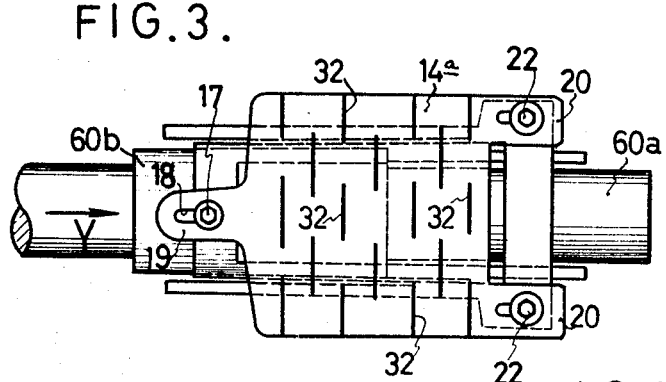
FIG. 3 is a bottom plan view of another embodiment of the invention to be incorporated between the bumper and chassis of a vehicle.
Figure 4:
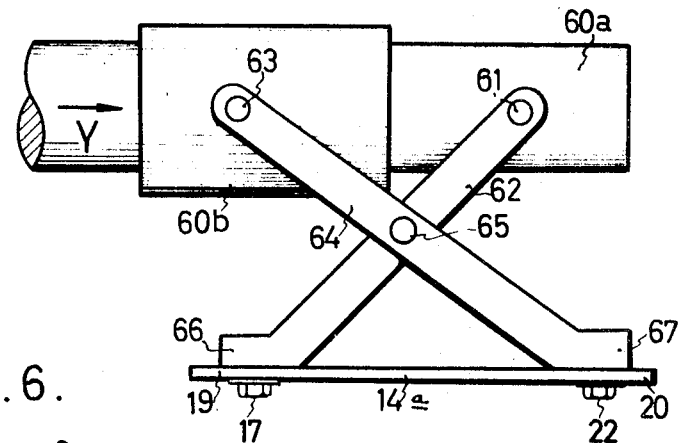
FIG. 4 is a side elevation of the embodiment of FIG. 3.

In FIGS. 3 and 4 is shown an embodiment of the invention adapted to be mounted between the bumper and chassis of a vehicle and thereby to absorb the energy of collision by plastic deformation of the bumper and the energy-absorbing member 14 when a force of collision shock is exerted on the bumper in the direction of the arrow Y. The mounting means comprises a supporting member 60b fixed to the chassis (not shown) by any conventional means, and the bumper (also not shown) fixed to the receiving member 60a. Member 60a is a heavy shaft slidable in the sleeve 60b. A link 62 of channel cross section has one end pivoted at 61 to member 60a and the other end 66 fastened to absorbing plate 14a by bolt 17. A second link 64, of channel cross section, has one end pivoted at 63 to the sleeve member 60b and the other end 67 fastened to the plate 14a by the bolt 22. The two links 62, 64 are crossed at their centers, preferably, and are pivoted on shaft 65. The energy absorbing member 14a corresponds exactly to plate 14 of FIGS. 1 and 5, except that it is flat, rather than curved. It will be seen in this embodiment that the energy-absorbing member 14a resists deformation in the direction of compression when the members 60a and 60b are moved toward each other. When the force of shock is in the direction of tension of the members, i.e., the members 60a and 60b tend to separate, and when the separating force exceeds a predetermined value, the energy-absorbing member 14a will be elongated by plastic deformation, spreading, or opening the slits 32 in the manner previously explained for the corresponding slits of the absorbing member 14, FIGS. 1 and 2.

According to the present invention, plastic deformation of the plate 14 or 14a can be produced by a very small external force and energy is absorbed when the longitudinal directions of the slits 32 are normal to the direction of working of the external force, if the material and size of the energy-absorbing plate and the size and number of the slits 32 are properly selected. The tensional force producing the plastic deformation becomes large with the diminishing of the angle formed between the direction of the force and the longitudinal axis of the plate 14. The amount of energy absorbed can be determined by the arrangement and interspaces of the slits 32. It is possible to provide the initial tensional force and the amount of energy absorption by suitable preselection of the material and thickness of the energy-absorbing member, and the locations and spacings of the slits. Thus, the energy-absorbing member is of simple construction and its assembly with the parts to be protected is also noncomplex, so that the energy-absorbing plate can be widely used in many places and its use is not restricted to automotive vehicles.

The longitudinal directions of the slits 32 should not coincide with, or be parallel with the direction of action of the shocking force, or the direction of sliding of the force-receiving and supporting members, because this would prevent plastic deformation and opening of the slits. Therefore, the longitudinal directions of the slits must not agree with the sliding direction of the said two force-receiving and supporting members, but preferably, should be in a crosswise, or a normal direction to the collision force.

It will be apparent from the above that the energy absorbing member of the invention is preferably designed as a plate-shaped member with closed, or nearly closed slits therein. A shock force plastically deforms the energy absorbing member to open the slits. Even though the initial tension producing the plastic deformation is large, the movement of the receiving member relative to the supporting member is small, so that the device is adapted for energy absorption where the amount of energy for absorption and the initial tension are large while the allowable amount of deformation, and relative sliding movement of the supporting and force-receiving members are small.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What we claim is:

1. An energy-absorbing device comprising a receiving member for transmission of an external force, a supporting member movably supporting said receiving member, and an energy-absorbing member having end portions respectively fixed to said receiving and supporting members, said energy-absorbing member being an elongated plate formed of a material having high resistance to plastic deformation and being provided with a plurality of spaced narrow slits lying in lines perpendicular to the longitudinal direction of the plate, said slits having edges lying in close or abutting relation, and certain of said slits disposed entirely within and spaced from the edges of the plate being closed at both ends, whereby said slits will open only upon application of an external longitudinal force tending to elongate the plate.

2. An energy-absorbing device according to claim 1, wherein said supporting member slidably supports said receiving member.

3. An energy-absorbing device according to claim 1, wherein said slits of one line are staggered in relation to those of the adjacent line.

4. An energy-absorbing device according to claim 1, wherein certain of said slits open to the side edges of said plate.

5. An energy-absorbing device according to claim 1, wherein said energy-absorbing plate has a curved configuration.

6. An energy-absorbing device according to claim 1, wherein said energy-absorbing plate is flat.

7. An energy-absorbing device according to claim 1, wherein both said supporting and receiving members have axes parallel to the axis of the plate and said supporting member slidably guides said receiving member in coaxial relation.